United States Patent
Gennick

[15] 3,679,077
[45] July 25, 1972

[54] COUPLER BETWEEN A DUMPABLE CONTAINER AND A RECEIVING CONTAINER

[72] Inventor: William Gennick, Detroit, Mich.
[73] Assignee: Ford Motor Company, Dearborn, Mich.
[22] Filed: Oct. 29, 1970
[21] Appl. No.: 85,019

[52] U.S. Cl..............................214/302, 214/318
[51] Int. Cl. ...........................................B65f 3/02
[58] Field of Search.....................287/20 R; 312/293, 138; 211/123; 214/302, 318; 16/147; 292/304, 216, 218

[56] References Cited

UNITED STATES PATENTS 2,928,562  3/1960  Gollnick ................................214/318
3,319,991  5/1967  Ratcliff .................................294/82 R
3,291,329  12/1966  Ord......................................214/313

Primary Examiner—Gerald M. Forlenza
Assistant Examiner—Lawrence J. Oresky
Attorney—John R. Faulkner and Roger E. Erickson

[57] ABSTRACT

A coupling means for pivotally attaching a dumpable container to a hopper. As the container pivots it engages a rotatable portion of the coupling means which moves with the container and locks the container to the hopper.

The coupling means comprises primarily a pair of slotted members, one of which is rotatable from an open position in which the slots are aligned to a closed, locked position.

3 Claims, 6 Drawing Figures

PATENTED JUL 25 1972 BEST AVAILABLE COPY 3,679,077
SHEET 1 OF 2
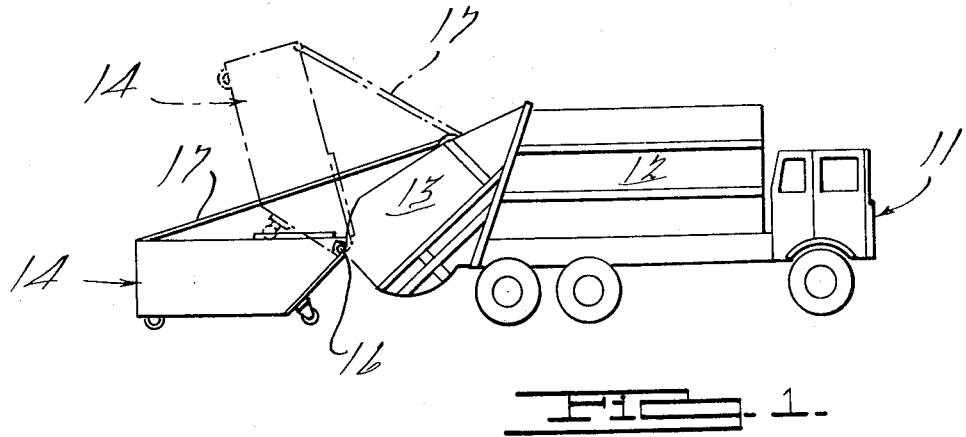
FIG. 1.
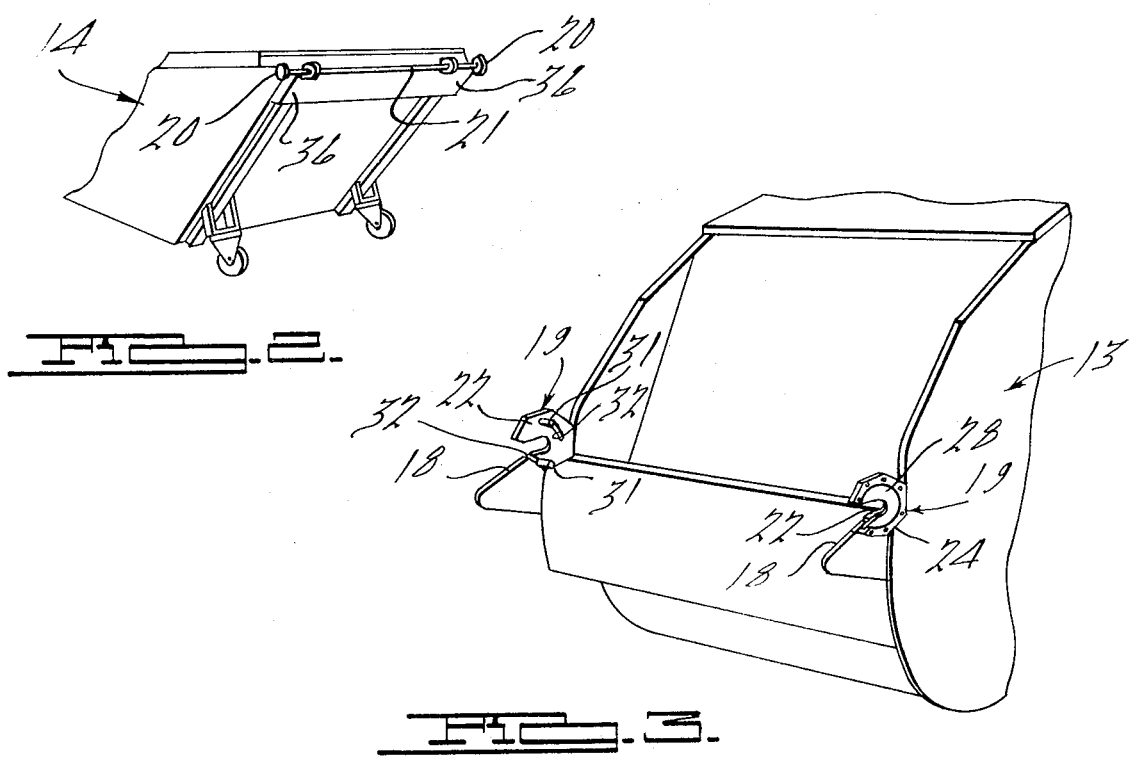
FIG. 2.
FIG. 3.
INVENTOR.
William Gennick
BY John R. Faulkner
Roger E. Erickson
ATTORNEYS.

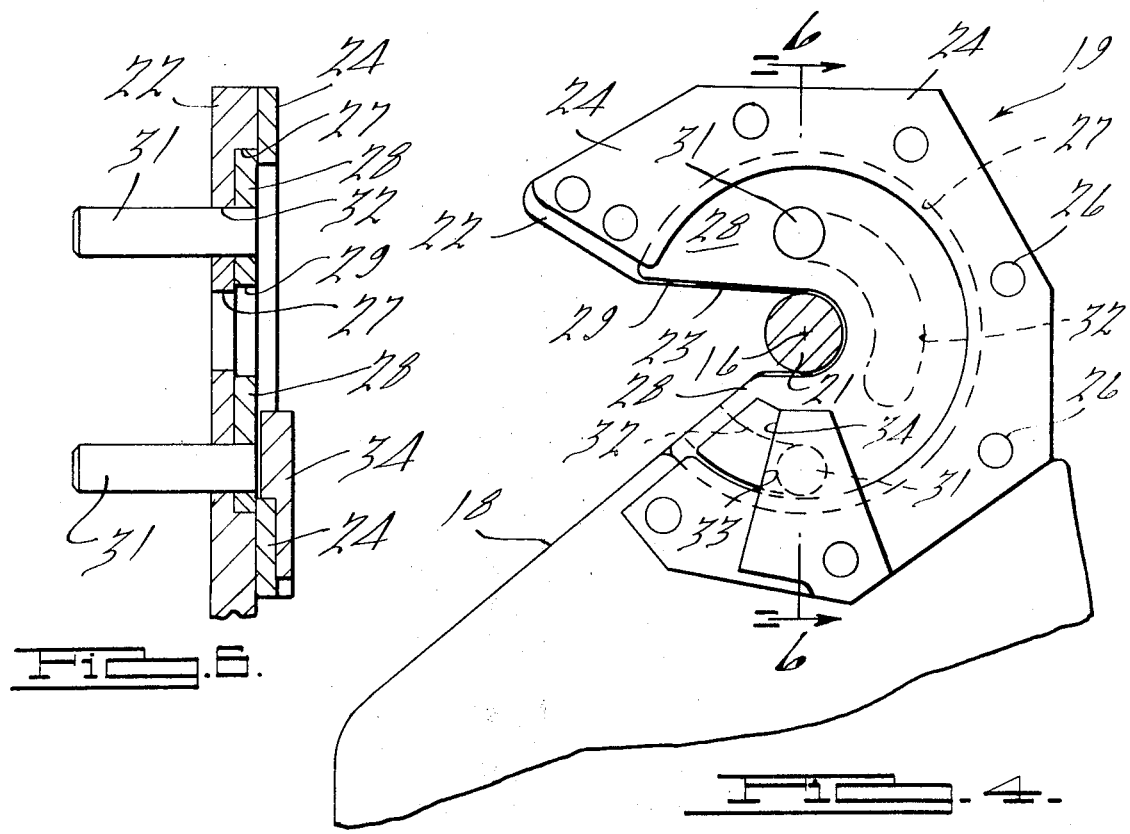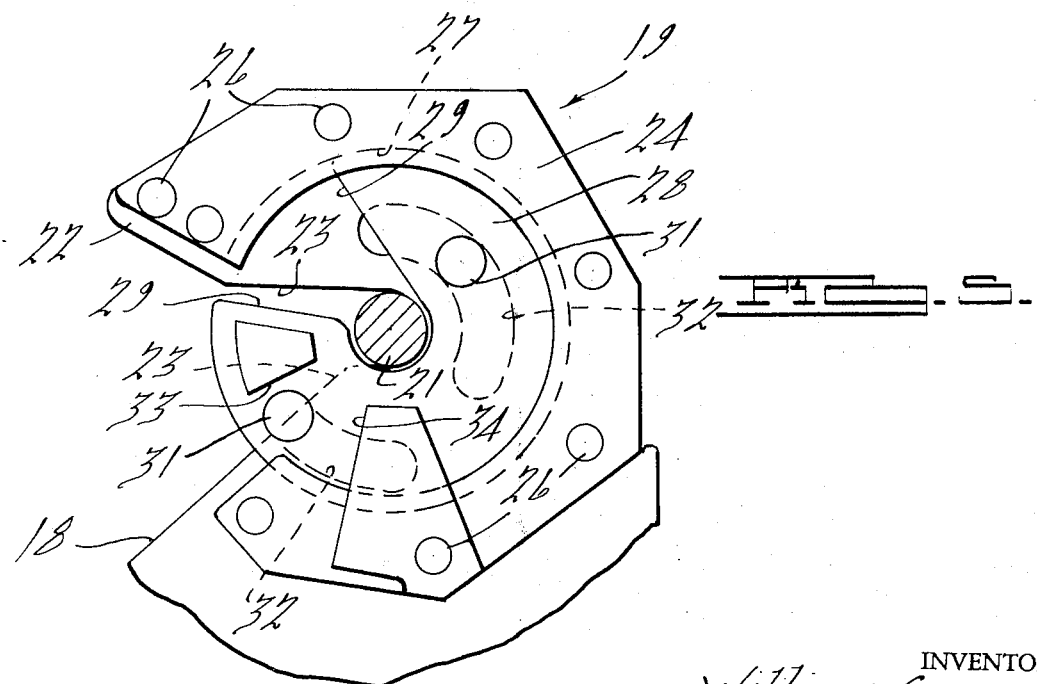

COUPLER BETWEEN A DUMPABLE CONTAINER AND A RECEIVING CONTAINER

BACKGROUND OF THE INVENTION

A common means of handling refuse is to have site located containers which may be coupled to and dumped into a typical refuse hauling truck. The refuse is transported by the truck to an incinerator and the container remains at the site. The container often has a front mounted bar or shaft which when coupled to the truck nests within a pair of slotted "ears" mounted on the rearward portion of the truck hopper. A winch drawn cable extends from the truck to the rear of the container as shown in FIG. 1 of the drawings and as it is drawn in causes the container to dump into the truck hopper.

This means of coupling the container to the truck has proven unsatisfactory when the hopper of the truck includes a hydraulic compactor for compressing the refuse into the load carrying portion of the truck body.

When there were oversize or incompactible pieces of trash, such as a wooden beam, return movement of the compactor could cause the container, while in a raised dumping position, to be unintentially released from the slotted ears and to subject the operators to potential injury.

This invention provides a means of pivotally connecting a container to a hopper for dumping therein which is not subject to unintentional release when the container is in a raised position. The invention further provides a connecting means which is automatically locked as the container is raised for dumping and automatically opened as the container is lowered. It also provides a connecting means which is economical to build and use which requires no controls for operation.

BRIEF SUMMARY OF THE INVENTION

A coupler constructed in accordance with this invention includes first and second members being relatively rotatable and each having a radially disposed slot. The slots are alignable to receive a shaft element. Rotation of one member relative to the other causes the slot to enclose the shaft element and prevent its release. The coupler is particularly suited for use in pivotally connecting a dumpable container to a hopper such as on a refuse hauling truck.

BRIEF DESCRIPTION OF THE DRAWINGS

FIG. 1 is a side elevational view of a refuse hauling truck and a dumpable container pivotally attached thereto. The broken lines illustrate the extreme raised position of the container.

FIG. 2 is a perspective view showing the front portion of the truck. FIG. 3 is a perspective view showing the rear, hopper portion of the truck.

FIG. 4 is a side elevational view of the pivot-lock assembly in an open position.

FIG. 5 is a side elevational view similar to FIG. 4, but showing the pivot-lock assembly in a closed position.

FIG. 6 is a cross-sectional view along line 6—6 of FIG. 5.

DETAILED DESCRIPTION OF A PREFERRED EMBODIMENT

A refuse hauling truck is illustrated generally by the numeral 11 and includes a load carrying portion 12 and a hopper portion 13. The hopper includes means to compress the refuse and to move the compressed material to the load carrying portion of the truck (not shown). A dumpable trash container is referred to generally by numeral 14 and is pivotally connectable to the truck hopper at point 16. A winch drawn cable 17 extends from the truck to the back portion of the container and is drawn in to raise the container, causing its contents to dump into the hopper.

Secured to the rearwardmost portion of the hopper 13 are a pair of ramp members 18 and rotary lock assemblies 19. Secured to the forwardmost portion of the refuse container 14 is a bar or shaft 21. The vertical height of the axis of the bar when the container immediately prior to engagement with the ramp is preferably a few inches lower tan the vertical height of the center of the lock assembly so that the ramps lift the front end of the container upon engagement. A pair of guides 20 mounted to each end of the shaft aid in locating the shaft within the lock assemblies.

FIG. 4 and 5 illustrate a rotary lock assembly 19 in open and partially closed positions, respectively. The lock includes a fixed member 22 having a notch 23 formed therein functioning in part has an extension of ramp 18. A retaining member 24 is secured to the fixed member by suitable threaded fasteners 26 and defines circular channel 27 between the inner wall of the retaining means and the stationary member. Within this circular channel is rotatably mounted a generally circular member 28 having a notch 29 identical to and rotatably alignable with the notch of the fixed member. The bases of the notches 23 and 29 have a radius substantially equal to the radius of the shaft 21. When the shaft is seated against the bases of the notches 23 and 29 the circumference of the rotatable member, the circular base of the channel and the shaft each have a common center line.

Extending axially from the inside of the circular member 28 are a pair of pins 31 which extend through a pair of circular slots 32 formed in the fixed member. Extending from the outside of the rotatable member is an abutment 33 which is engageable with a second abutment 34 secured to the retainer 24. The pins 31, grooves 32 and abutments 33 and 34 provide stop means defining the range of angular travel of the rotatable member 28. The pins also are engageable with a portion of 36 of the container and move with the container 14 as it pivots relative to the truck hopper 13 about axis 16.

Pins 31 and abutment portions 36 are only one of several means to rotate the circular member 28 with the container 14 about axis 16. The means heretofore described is preferred because it is more "universal" or can be employed with little or no modification to presently used containers. Alternately, a shaft 21 having a cross sectional shape mateable with a corresponding shape at the base of the notch of the circular member 28 could be used. A square shaft and notch base or a shaft with a protruding key received within a matching keyway in the circular member are examples.

OPERATION

The rotary lock assembly 19 is in an open position, as shown in FIG. 4, except when the container 14 is attached and being dumped. To couple the container the truck operator backs the truck 11 toward the front end of the container until the ends of shaft 21 traverse ramps 18 and become fully received within slots 23 and 29. Cable 17 is connected to the rear of the container and is drawn in by a hopper mounted power winch (not shown) causing the container to dump. Portions 36 of the container engage the pins 31 of the lock assemblies to cause rotation of circular members 28 identical to that of the container. As the circular member of each lock assembly rotates it closes about the ends of the shaft member 21. FIG. 5 shows the relationship of the lock assembly elements when circular member 28 is rotated nearly half of its range of travel. It may thus be seen that except during the initial closing movement of member 28 the shaft 21 is locked between slots 23 and 29 so that its release is prevented. When the container is in its fully raised position, at which time the trash compactor is operated, the lock is fully closed. The lock assembly is automatically opened as the container is lowered from its raised position.

Modifications and alterations will occur to those skilled in the art which are included within the scope of the following claims.

I claim:

1 A coupler for connecting a dumpable container to a receiving hopper including:

an essentially horizontal shaft element secured to said container, first abutment means on said container adjacent said shaft element, a first member secured to said hopper having a generally horizontal first slot, a second member rotatably secured to said hopper having a second slot formed therein, said second slot being rotatably alignable with said first slot in which position said shaft element is receivable therein, second abutment means on said second member engageable with said first abutment means when said shaft element is received within said slots, said first abutment means being pivotable relative to sad first member generally about the axis of said shaft element, said second member being rotatable with said first abutment means when said first and second abutment means are engaged to cause said slots to become out of alignment and to enclose said shaft element within said slots.

2. A coupler for connecting a dumpable container to a receiving hopper including:

an essentially horizontal shaft element secured to said container, first abutment means on said container adjacent said shaft element, a first member secured to said hopper having a generally horizontal first slot, a second member rotatably secured to said hopper having a second slot formed therein, said second slot being rotatably alignable with said first slot in which position said shaft element is receivable therein, second abutment means on said second member engageable with said first abutment means when said shaft element is received within said slots, said container being pivotable relative to said hopper generally about the axis of said shaft element, said second member being pivotable with said container when said first and second abutment means are engaged to cause said slots to become out of alignment and to enclose said shaft element within said slots.

3. A coupling means to couple a dumpable container to a receiving container comprising:

a shaft element secured to one of said containers, first abutment means on said one container adjacent said shaft element, a first member secured to the other of said containers and having a first slot formed therein, a second member having a second slot formed therein and being rotatably secured to said first member, said first and second slots being alignable to receive said shaft element, second abutment means on said second member engageable with said first abutment means when said shaft element is received within said slots, relative movement of said containers about said shaft element causing said second member to rotate relative to said first member from its aligned position to a nonaligned position to form an enclosure to retain the shaft element at the base of the slots.

* * * * *